United States Patent
Trainin

(10) Patent No.: US 8,041,857 B2
(45) Date of Patent: Oct. 18, 2011

(54) DYNAMIC A-MSDU ENABLING

(75) Inventor: Solomon Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 12/454,157

(22) Filed: May 12, 2009

(65) Prior Publication Data

US 2009/0228619 A1 Sep. 10, 2009

Related U.S. Application Data

(63) Continuation of application No. 11/847,366, filed on Aug. 30, 2007, now Pat. No. 7,574,539.

(51) Int. Cl.
G06F 5/00 (2006.01)
H04L 12/28 (2006.01)
(52) U.S. Cl. .......................... 710/56; 710/310; 370/412
(58) Field of Classification Search .............. 710/52–57, 710/310; 370/412, 389, 338, 445
See application file for complete search history.

(56) References Cited

U.S. PATENT DOCUMENTS

| 7,114,043 B2 * | 9/2006 | Rowlands .................. 711/154 |
| 7,848,330 B2 * | 12/2010 | Nishibayashi et al. ....... 370/392 |
| 2005/0204247 A1 * | 9/2005 | Guo et al. ................... 714/746 |
| 2006/0084389 A1 * | 4/2006 | Beale et al. ................ 455/67.11 |
| 2006/0223585 A1 * | 10/2006 | Legg .......................... 370/338 |
| 2006/0280194 A1 * | 12/2006 | Jang et al. ................... 370/412 |

OTHER PUBLICATIONS

"Draft Standard for Information Technology—Telecommunications and information exchange between systems—Local and metropolitan area networks—Specific requirements—Part 11: Wireless LAN Medium Access Control (MAC) and Physical Layer (PHY) specifications—Amendment 5: Enhancements for Higher Throughput", IEEE P802.11n™/ D8.0, Feb. 2009, 11 pages.

* cited by examiner

*Primary Examiner* — Christopher B Shin
(74) *Attorney, Agent, or Firm* — Scott M. Lane

(57) ABSTRACT

A dynamic A-MSDU enabling method is disclosed. The method enables the recipient of an aggregate MAC service data unit (A-MSDU) under a block ACK agreement to reject the A-MSDU. The method thus distinguishes between A-MSDU outside of the block ACK agreement, which is mandatory, from A-MSDU under the block ACK agreement, which is optional. The method thus complies with the 802.11n specification while enabling the recipient to intelligently allocate memory during block ACK operations.

34 Claims, 4 Drawing Sheets

Figure 2 block ACK parameter set fixed field (20)

| $B_0$ | $B_1$ | $B_2 - B_5$ | $B_6 - B_{15}$ |
|---|---|---|---|
| no A-MSDU in block ACK | block ACK policy | TID | buffer size |

Figure 3

ADDBA response frame body (30)

| order | information |
|---|---|
| 1 | category |
| 2 | action |
| 3 | dialog token |
| 4 | status code |
| 5 | block ACK parameter set |
| 6 | block ACK timeout value |

Figure 4A

1st embodiment (40)

| $B_0 = 0$ | A-MSDU and A-MSDU on top of A-MPDU |
|---|---|
| $B_0 = 1$ | A-MSDU only |

Figure 4B

2nd embodiment (50)

| $B_0 = 0$ | A-MSDU and A-MSDU on top of A-MPDU |
|---|---|
| $B_0 = 1$ | no A-MSDU in block ACK |

Figure 4C

3rd embodiment (60)

| $B_0 = 0$ | A-MSDU only |
|---|---|
| $B_0 = 1$ | A-MSDU and A-MSDU on top of A-MPDU |

Figure 4D

4th embodiment (70)

| $B_0 = 0$ | no A-MSDU in block ACK |
|---|---|
| $B_0 = 1$ | A-MSDU and A-MSDU on top of A-MPDU |

DYNAMIC A-MSDU ENABLING

CLAIM OF PRIORITY

This application is a continuation of U.S. patent application Ser. No. 11/847,366 filed on Aug. 30, 2007 now U.S. Pat. No. 7,574,539.

TECHNICAL FIELD

This application relates to wireless transmission under 802.11 and, more particularly, to packet aggregation under this standard.

BACKGROUND

The Institute of Electrical and Electronics Engineers (IEEE) has adopted a set of standards for wireless local area networks (LANs), known as 802.11. Wireless products satisfying 802.11a, 802.11b, and 802.11g are currently on the market, for example.

Recently, an 802.11n standard, known also as the Enhancement for High Throughput wireless standard, has emerged. Under the 802.11n standard, transmitters and receivers each have multiple antennas for transmission and reception of data. As a multiple input, multiple output (MIMO) technology, 802.11n is designed to coordinate multiple simultaneous radio signals, and is expected to support a bandwidth of greater than 100 megabits per second (Mbps).

Under 802.11, a device (or client), also known as a station (STA), accesses a wireless LAN (WLAN) by following a communication protocol, essentially involving the transmission of frames to an access point (AP). The frames, or packets, may be data frames, control frames, or management frames. The frames convey information that enables the AP to "connect" the device to the WLAN. The APs and STAs in a WLAN constitute a wireless neighborhood.

The 802.11n specification defines two parallel types of packet aggregation: aggregate MAC service data unit (A-MSDU) and aggregate MAC protocol data unit (A-MPDU), where MAC is shorthand for medium access controller. The A-MSDU and A-MPDU may be used separately or together. A MAC service data unit (MSDU) is the frame entering or exiting the top of the MAC. A MAC protocol data unit (MPDU) is the frame entering or exiting the bottom of the MAC.

The aggregate MSDU, A-MSDU, aggregates data MSDUs into one MAC protocol data unit, or MPDU. Each such packet included in the MPDU contains a short header with the byte count, the destination address, and the source address. The aggregate MPDU, A-MPDU, aggregates MPDUs into one PHY protocol data unit, or PPDU, with PHY being shorthand for the physical layer of the stack.

A merger of both aggregation types, A-MSDU and A-MPDU, means that an MPDU containing A-MSDU is included in A-MPDU. Both types of aggregation are mandatory in the current draft of the 802.11n specification. The receiver, or recipient, is therefore expected to support both types of aggregation when prompted by the transmitter, or originator.

Under 802.11n, the maximum size, known as the maximum transmission unit, or MTU, of A-MSDU is approximately 4 Kilobytes (Kbytes). The MTU that can be sent by MPDU is 1500 bytes. To support A-MSDU, the recipient has to be able to receive the full-sized A-MSDU. In other words, the recipient must allocate memory to receive the A-MSDU packet.

There are two ways to transmit an A-MSDU packet. The packet may be sent under the normal acknowledge (ACK) protocol. Alternatively, the packet may be transmitted using a block ACK agreement. An A-MPDU, by contrast, mandates using a block ACK agreement.

To use or not use either type of aggregation, A-MSDU or A-MPDU, is entirely up to the originator, the station that transmits the data. The station that receives the data, or recipient, should be prepared to receive the data, whatever the aggregation types is. A station that receives an "add block ACK (ADDBA) request" should allocate a block ACK (BA) reordering buffer. ADDBA request is the name of the action frame that is used to establish the block ACK agreement. A BA reordering buffer contains several buffers, in which each one is of the MTU for A-MSDU size (e.g., ~4 Kbytes). This must be done by the recipient station, even when the originator has no intent to merge A-MSDU into A-MPDU. Thus, even where the originator does not send the A-MSDU packets aggregated into an A-MPDU packet, the recipient has allocated the larger MTU size for each buffer in the BA reordering buffer. In such a situation, more than half of the memory allocation in the recipient buffer is wasted. That is, 4000 Kbytes-1500 Kbytes, or 2500 Kbytes, of each buffer is wasted.

Thus, there is a continuing need for a packet aggregation method that is efficient for the recipient while supporting the 802.11n specification.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 2 is a block diagram of a block ACK parameter set fixed field used by the method of FIGS. 1A and 1B, according to some embodiments;

FIG. 3 is a block diagram of an ADDBA response frame body used by the method of FIGS. 1A and 1B, according to some embodiments; and FIGS. 4A-4D are bitmaps of four possible interpretations of the zeroth bit of the block ACK parameter set fixed field of FIG. 2, according to some embodiments.

DETAILED DESCRIPTION

In accordance with the embodiments described herein, a dynamic A-MSDU enabling method is disclosed. The method enables the recipient of an aggregate MAC service data unit (A-MSDU) under a block ACK agreement to reject the A-MSDU. The method thus distinguishes between A-MSDU outside of the block ACK agreement, which is mandatory, from A-MSDU under the block ACK agreement, which is optional. The method thus complies with the 802.11n specification while enabling the recipient to intelligently allocate memory during block ACK operations.

As described, above, support of A-MSDU outside of the block ACK agreement, that is, under the normal ACK agreement, is mandatory by the recipient. However, support of A-MSDU under the block ACK agreement is optional. This nuance of the 802.11n specification is exploited by the method described herein.

Figure 1A:
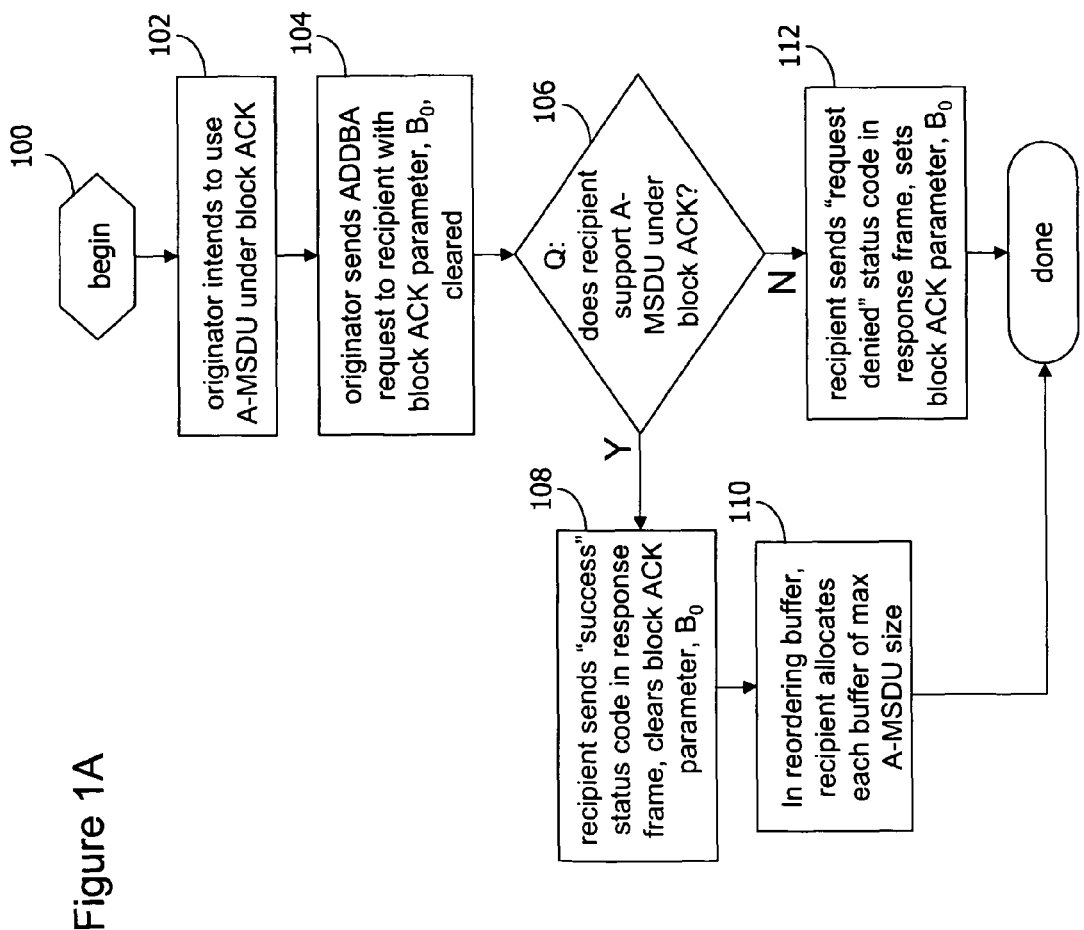
FIGS. 1A and 1B are flow diagrams depicting operations of a dynamic A-MSDU enabling method, according to some embodiments.
Figure 1B:
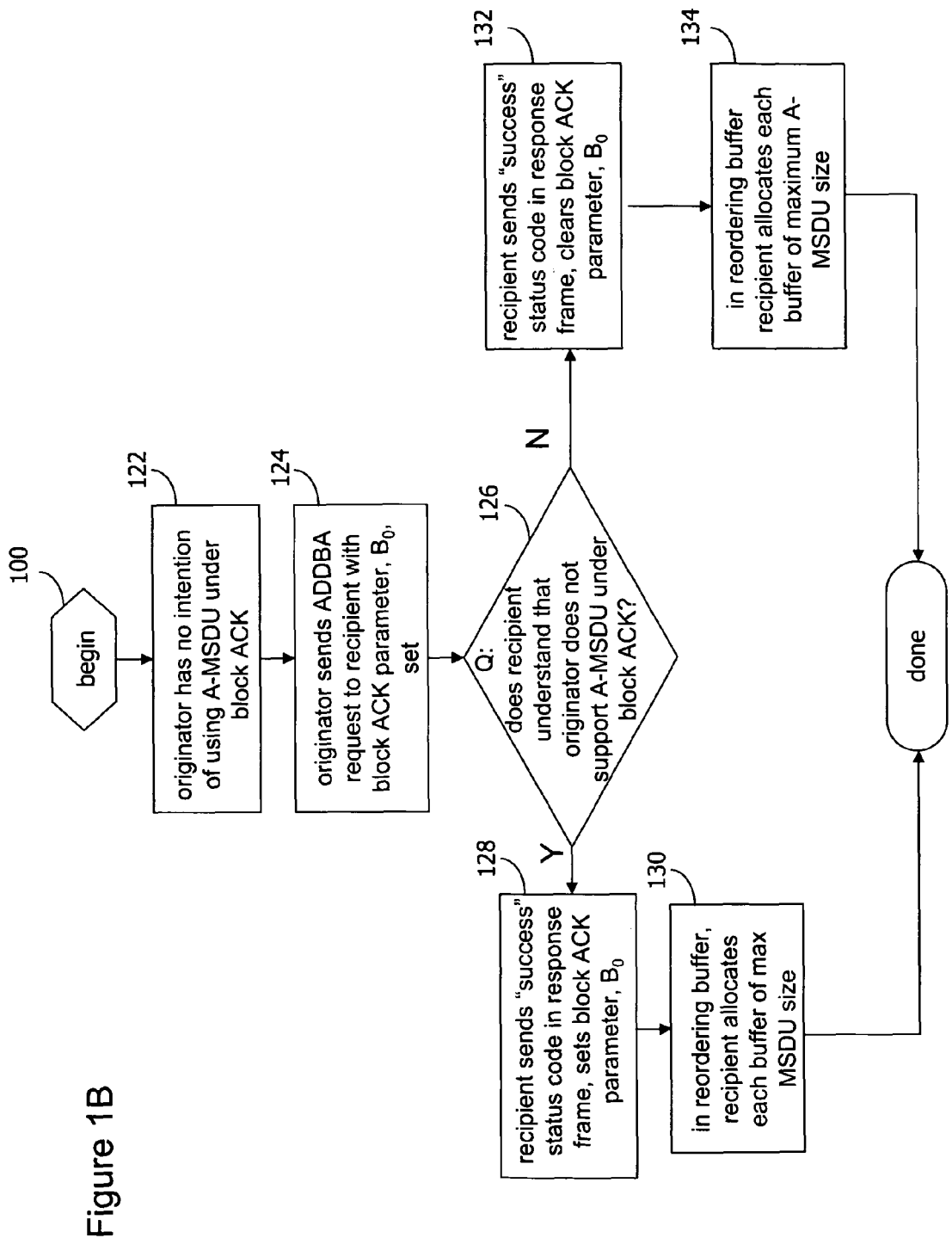

FIGS. 1A and 1B are flow diagrams depicting operations of a dynamic A-MSDU enabling method 100, according to some embodiments. The dynamic A-MSDU enabling method provides a workable approach to supporting A-MSDU and A-MPDU by the recipient in accordance with the 802.11n specification. FIG. 1A includes operations performed by the method 100 when the originator intends to use A-MSDU under the block ACK agreement; FIG. 1B includes operations performed by the method 100 when the originator does not intend to use A-MSDU under the block ACK agreement. The method 100 is backwards-compatible, enabling recipients not knowledgeable about the method to nevertheless operate in a predictable manner when the block ACK agreement (ADDBA request and ADDBA response) take place in the wireless neighborhood.

The method 100 employs two parameters used for communication between the originator and the recipient. FIGS. 2 and 3 include a block ACK parameter set fixed field 20 and an ADDBA response frame body 30, respectively, both of which are used by the originator and recipient in establishing the block ACK agreement. Formerly reserved bit, $B_0$, of the block ACK parameter set fixed field 20 indicates whether A-MSDU is to be used under the block ACK agreement or not.

FIGS. 4A-4D illustrate four possible interpretations of the bit, $B_0$, of the block ACK parameter set fixed field 20, according to some embodiments. Each embodiment 40, 50, 60, and 70 describe the first polarity and second polarity of the bit, $B_0$, in a different way. In a first embodiment 40 (FIG. 4A), when the bit, $B_0$, of the block ACK parameter set fixed field 20 is set to a "1", A-MSDU only is supported, but not A-MSDU and A-MSDU on top of A-MPDU, as described above. In a second embodiment 50 (FIG. 4B), when the bit, $B_0$, of the block ACK parameter set fixed field 20 is set to a "1", A-MSDU is not supported at all in the block ACK agreement. Notice that, in both embodiments 40 and 50, when the bit, $B_0$, of the block ACK parameter set fixed field 20 is set to a "0", A-MSDU and A-MSDU on top of A-MPDU is supported, which is backwards-compatible with recipients that are not knowledgeable of the method 100, that is, legacy recipients.

Also, the opposite non-backward compatible embodiment 60 may exist as depicted in FIG. 4C. In contrast to the embodiment 40 of FIG. 4A, in the embodiment 60, when the bit, $B_0$, of the block ACK parameter set fixed field 20 is set to a "1", the A-MSDU and A-MSDU on top of A-MPDU are supported in the block ACK agreement. A station shall only transmit an A-MSDU within a MPDU under a block ACK agreement if the recipient indicates support for A-MSDU by setting the A-MSDU supported field to a "1" in its ADDBA response frame. FIG. 4D, in contrast to FIG. 4B, shows an embodiment 70 in which the polarity of the bit, $B_0$, is reversed.

In the second embodiment 50 (FIG. 4B), the status code field of the ADDBA response frame 30 may contain "successful" also where the recipient is not supporting A-MSDU at all under the block ACK agreement. The second embodiment thus allows establishing the block ACK agreement in one shot. Either the recipient supports A-MSDU entirely (A-MSDU and A-MSDU on top of A-MPDU) or does not (no A-MSDU in block ACK).

Returning to FIGS. 1A and 1B, the method 100 commences with the actions of the originator. The originator may intend to use A-MSDU under block ACK (FIG. 1A, block 102) or may intend not to use A-MSDU under block ACK (FIG. 1B, block 122). The case where the originator intends to use A-MSDU under the block ACK agreement is first described (FIG. 1A). To indicate its intention, the originator sends an ADDBA request (add block ACK request) to the recipient, with the bit, $B_0$, of the block ACK parameter set fixed field 20 cleared (block 104). If the recipient supports A-MSDU under the block ACK agreement (the "yes" prong of block 106), the recipient sends a "success" status code (FIG. 3, order 4) in the ADDBA response frame body 30 and clears the bit, $B_0$ (block 108). The recipient then allocates each buffer for A-MSDU size in accordance with the block ACK agreement (block 110).

Where the recipient does not support A-MSDU under the block ACK agreement (the "no" prong of block 106), the recipient sends a "request denied" status code in the ADDBA response frame body 30 and sets the bit, $B_0$ (block 112). In either case, the recipient has control over whether memory is to be allocated, due to the designation of A-MSDU under block ACK as optional in the 802.11n specification. The next time, the originator may attempt to establish the block ACK agreement by setting the bit, $B_0$.

The case where the originator does not intend to use A-MSDU under the block ACK agreement is next described (FIG. 1B). This time, the originator sends an ADDBA request (add block ACK request) to the recipient, with the bit, $B_0$, of the block ACK parameter set fixed field 20 set (block 124). If the recipient understands that the originator does not use A-MSDU under the block ACK agreement (the "yes" prong of block 126), the recipient sends a "success" status code in the ADDBA response frame body 30 and sets the bit, $B_0$ (block 128). The recipient then allocates each buffer for MSDU size in accordance with the block ACK agreement (block 130).

Where the recipient does not understand that the originator does not use A-MSDU under the block ACK agreement (the "no" prong of block 126), the recipient sends a "success" status code in the ADDBA response frame body 30 and clears the bit, $B_0$ (block 132). This is the legacy recipient situation. In this case, memory for A-MSDU need not be allocated, since the originator does not request it. For the non-legacy recipient, memory is not allocated. Nevertheless, for legacy systems, the memory will be allocated, as always (block 134).

Without the dynamic A-MSDU enabling method 100, the recipient is expected to always support A-MSDU, either under the block ACK agreement or under normal ACK, with no relation to what the originator intends. This is a waste of memory resources for the recipient. The method 100 empowers the recipient to extract information (from originators that support the method) so as to allocate its memory resource efficiently.

The dynamic A-MSDU enabling method 100 enables negotiation between the originator and the recipient during each and every block ACK agreement. Thus, the decision made takes in consideration the capabilities of both sides to utilize A-MSDU, depending on the current state of resources (memory and CPU utilization). Where the current approach is resource wasteful, the method 100 enables the recipient to intelligently allocate the resource.

In the MIMO basic service set (BSS), the dynamic A-MSDU enabling method 100 increases by more than twofold the number of block ACK agreements supported in parallel, while keeping the same amount of memory allocated for the buffering of the frame, in some embodiments. Thus, the method 100 may increase client throughput performance in MIMO BSSs by enabling more buffers in the reordering buffer space.

While the application has been described with respect to a limited number of embodiments, those skilled in the art will appreciate numerous modifications and variations therefrom.

It is intended that the appended claims cover all such modifications and variations as fall within the true spirit and scope of the above description.

I claim:

1. A method of allocating memory in a buffer of a station, comprising:
   transmitting a response frame from the station, wherein the response frame indicates support for receiving an aggregate medium access controller (MAC) service data unit (A-MSDU) under a block acknowledge (ACK) agreement and wherein the response frame indicates the buffer is configured to hold the A-MSDU; and
   receiving the A-MSDU in a MAC protocol data unit (MPDU) under the block ACK agreement.

2. The method of claim 1, further including receiving an block ACK request indicating an intent to transmit an A-MSDU under the block ACK agreement.

3. The method of claim 1, wherein allocating memory in the buffer provides a capability to hold the A-MSDU of a first size.

4. The method of claim 3, wherein the A-MSDU is not transmitted if the A-MSDU is greater than the first size.

5. The method of claim 1, further including receiving a second A-MSDU according to a second block ACK agreement.

6. The method of claim 1, wherein the response frame is an add block acknowledge (ADDBA) response frame.

7. A method, comprising:
   transmitting an add block acknowledge (ADDBA) response frame from a station, the ADDBA response frame comprising a field to indicate whether the station supports an aggregate medium access controller (MAC) service data unit (A-MSDU) under a block acknowledge (ACK) agreement;
   allocating a buffer in the station to hold the A-MSDU; and
   receiving the A-MSDU in a MAC protocol data unit (MPDU) under the block ACK agreement if the field indicates support for A-MSDU under the block ACK agreement.

8. The method of claim 7, further including receiving an ADDBA request frame to indicate an intent to use A-MSDU under the block ACK agreement.

9. The method of claim 7, wherein the allocation of the buffer is the maximum size of an A-MSDU supported by the station.

10. The method of claim 7, wherein the field is set to 1 to indicate support for A-MSDU under the block ACK agreement.

11. The method of claim 10, wherein the A-MSDU on top of an aggregated MPDU (A-MPDU) is also supported under the block ACK agreement.

12. The method of claim 7, wherein the field is set to 0 to indicate support for A-MSDU under the block ACK agreement.

13. The method of claim 12, wherein the A-MSDU on top of an aggregated MPDU (A-MPDU) is also supported under the block ACK agreement.

14. The method of claim 7, further including receiving a second A-MSDU according to a second block ACK agreement.

15. A method comprising:
   transmitting an add block acknowledge (ADDBA) response frame from a station, the ADDBA response frame comprising a field to indicate that the station does not support aggregate medium access controller (MAC) service data units (A-MSDU) under a block acknowledge (ACK) agreement;
   allocating a buffer in the station to hold a MAC service data unit (MSDU); and
   receiving the MSDU.

16. The method of claim 15, further including receiving an ADDBA request frame to indicate an intent to use A-MSDU under the block ACK agreement.

17. The method of claim 15, wherein the field is set to 1.

18. The method of claim 15, wherein the field is set to 0.

19. A method, comprising:
   receiving an add block acknowledge (ADDBA) response frame from a station, the ADDBA response frame including a field to indicate whether the station supports reception of an aggregate medium access controller (MAC) service data unit (A-MSDU) under a block acknowledge (ACK) agreement; and
   transmitting the A-MSDU in a MAC protocol data unit (MPDU) under the block ACK agreement if the field indicates support for A-MSDU under the block ACK agreement.

20. The method of claim 19, further including sending an ADDBA request frame to indicate an intent to use A-MSDU under the block ACK agreement.

21. The method of claim 19, wherein the field is set to 1 to indicate that the station supports reception of an A-MSDU under the block ACK agreement.

22. The method of claim 19, wherein the field is set to 0 to indicate that the station supports reception of an A-MSDU under the block ACK agreement.

23. The method of claim 19, further including transmitting a second A-MSDU according to a second block ACK agreement.

24. A station comprising:
   a transmitter to transmit an add block acknowledge (ADDBA) response frame, the ADDBA response frame comprising a field to indicate whether the station supports an aggregate medium access controller (MAC) service data unit (A-MSDU) under a block acknowledge (ACK) agreement;
   a memory, wherein the memory is allocated to hold the A-MSDU; and
   a receiver to receive the A-MSDU in a MAC protocol data unit (MPDU) under the block ACK agreement if the field indicates support for A-MSDU under the block ACK agreement.

25. The station of claim 24, further including receiving an ADDBA request frame by the receiver to indicate an intent to use A-MSDU under the block ACK agreement.

26. The station of claim 24, wherein the allocation of the memory is a maximum size of an A-MSDU supported by the station.

27. The station of claim 24, wherein the field is set to 1 to indicate support for A-MSDU under the block ACK agreement.

28. The station of claim 24, wherein the field is set to 0 to indicate support for A-MSDU under the block ACK agreement.

29. The station of claim 24, further including the receiver to receive a second A-MSDU according to a second block ACK agreement.

30. An apparatus comprising:
   a receiver to receive an add block acknowledge (ADDBA) response frame from a station, the ADDBA response frame including a field to indicate whether the station supports reception of an aggregate medium access controller (MAC) service data unit (A-MSDU) under a block acknowledge (ACK) agreement; and a transmitter to transmit the A-MSDU in a MAC protocol data unit (MPDU) under the block ACK agreement if the field indicates support for A-MSDU under the block ACK agreement.

31. The apparatus of claim 30, further including the transmitter to send an add block ACK request frame to indicate an intent to use A-MSDU under the block ACK agreement.

32. The apparatus of claim 30, wherein the field is set to 1 to indicate that the station supports reception of an A-MSDU under the block ACK agreement.

33. The apparatus of claim 30, wherein the field is set to 0 to indicate that the station supports reception of an A-MSDU under a block ACK agreement.

34. The apparatus of claim 30, further including the transmitter to send a second A-MSDU according to a second block ACK agreement.

* * * * *